(12) United States Patent
Bogner et al.

(10) Patent No.: US 6,750,429 B2
(45) Date of Patent: Jun. 15, 2004

(54) STORAGE COMPARTMENT FOR STORING WELDING-TYPE ACCESSORIES

(75) Inventors: Edwin Bogner, Corona, CA (US); Michael A. Sammons, Appleton, WI (US); Ronald W. Colling, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/054,657

(22) Filed: Jan. 22, 2002

(65) Prior Publication Data

US 2003/0136773 A1 Jul. 24, 2003

(51) Int. Cl.$^7$ .............................. B23K 37/00
(52) U.S. Cl. ...................... 219/136; 312/246
(58) Field of Search .................. 219/136; 312/246, 312/334.13, 334.23, 334.7, 334.8

(56) References Cited

U.S. PATENT DOCUMENTS

| | | | | | |
|---|---|---|---|---|---|
| 2,253,403 | A | * | 8/1941 | Steinert ........................ | 219/136 |
| D202,442 | S | * | 9/1965 | Andre ......................... | D15/144 |
| 4,086,122 | A | * | 4/1978 | Bouyoucos et al. ......... | 156/556 |
| 4,625,949 | A | * | 12/1986 | Walker ........................ | 266/48 |
| 5,599,470 | A | * | 2/1997 | Peotter et al. .............. | 219/133 |
| 5,927,839 | A | * | 7/1999 | Alfaro ........................ | 312/301 |
| 6,051,809 | A | * | 4/2000 | Colella ........................ | 219/133 |
| 6,075,226 | A | * | 6/2000 | Kishbaugh ................... | 219/133 |
| 6,124,572 | A | * | 9/2000 | Spilger et al. ............... | 219/400 |
| 6,137,080 | A | * | 10/2000 | Borchardt et al. .......... | 219/133 |
| 2002/0163196 | A1 | * | 11/2002 | Brofft et al. ................. | 290/1 A |

FOREIGN PATENT DOCUMENTS

JP              05318117 A       * 12/1993

OTHER PUBLICATIONS

Lincoln Electric: Precision TIG 275 & 375, The Power to Perform, Product Sales Guide, Nov. 2001, section 5, slide 13.*
Lincoln Electric: Precision TIG 275 & 375, The Power to Perform, Product Sales Guide, pp. 1–41.
Lincoln Electric: Precision TIG 275, The Power to Perform, TIG Welders, pp. 1–4.
Miller Electric: Syncrowave 350 LX Owmer's Manual, OM–356, Jul. 2001.
Miller Electric: Syncrowave 250 DX Owner's Manual, OM–359, Jul. 2001.

* cited by examiner

*Primary Examiner*—Kiley Stoner
(74) *Attorney, Agent, or Firm*—John H. Pilarski; Mark W. Croll

(57) ABSTRACT

A drawer or other movable storage compartment disposed inside of a welding-type power supply for storing accessories used in welding, plasma cutting and induction heating applications is disclosed.

30 Claims, 2 Drawing Sheets

STORAGE COMPARTMENT FOR STORING WELDING-TYPE ACCESSORIES

FIELD OF THE INVENTION

The present invention relates generally to storage compartments for storing accessories used in welding, plasma cutting and induction heating applications. More specifically, it relates to a drawer for storing such accessories that is integrated into a welding-type power supply.

BACKGROUND OF THE INVENTION

Welding, plasma cutting and induction heating operations typically involve the use of many different types of accessories and other related items. It is desirable to have these accessories readily and conveniently accessible to the operator during the welding, plasma cutting and induction heating operations as well as before and after these operations are performed.

It should be understood that welding-type operation or welding-type application, as used herein, includes welding, plasma cutting or induction heating operations and applications. Similarly, welding-type accessory, as used herein, includes any accessories or other items used in connection with welding, plasma cutting or induction heating operations and applications including spare parts, torches, consumable materials, remote control units, instruction manuals, work orders, work instructions, gloves and various small tools. Finally, welding-type power supply, as used herein, includes welding power supplies, plasma cutters and induction heaters.

Small consumable storage compartments for welding and plasma cutting consumables have been included with some prior art welding-type power supplies. These prior art consumable storage compartments are fixedly mounted in an opening in the sidewall of the chassis of the welding-type power supply. A hinged door is provided on the front of the compartment to permit access to the inside of the compartment. Several shelves are located inside of the box for storing the various consumable materials. These prior art compartments are not, however, movable and do not slide in and out of the welding-type power supply.

These prior art consumable storage compartments are small in size and shallow in depth to avoid interfering with the internal electrical components of the machine. They can only accommodate small items as a result, such as small welding and plasma cutting consumable materials. They cannot accommodate larger welding-type accessories such as gloves, tools, spare torches, remote control units, instruction manuals or work orders.

Another problem with these prior art consumable storage compartments is that access to the inside of these compartments can only be gained from the side of the welding-type power supply. If the welding-type power supply is placed in a location where the sides of the machine are not accessible, the inside of the compartment is also not accessible.

Larger welding-type accessories have typically been stored in a tool box or other storage container that is completely separate from the welding-type power supply. The operator of the welding machine must carry around a separate storage container for these items as a result. Prior art movable welding carts that include a drawer for storing welding-type accessories are available. These carts can only accommodate smaller welding-type power supplies, however, and the cart drawer is inconveniently located beneath the welding-type power supply, typically near the floor.

It is desirable, therefore, to have a storage compartment integrated into the welding-type power supply. Preferably, the storage compartment will be configured and sized to accommodate the larger welding-type accessories such as spare torches, remote control units, instruction manuals, gloves and various tools. The storage compartment will also preferably be movable. The storage compartment will also preferably be a drawer located near the top of the welding-type power supply that can slide in and out of the power supply to allow for easy access to the drawer's contents. Preferably the inside of the storage compartment will be accessible from the front of the welding-type power supply.

SUMMARY OF THE PRESENT INVENTION

According to several aspects of the invention, an apparatus includes a welding-type power supply. One of these aspects includes a drawer integrated into the welding-type power supply while a second aspect includes a drawer disposed inside of the welding-type power supply. The drawer is disposed near the top of the welding-type power supply and above a control panel of the welding-type power supply in other embodiments. The welding-type power supply includes a chassis having a top panel in another embodiment and the drawer is disposed below the top panel.

The welding-type power supply includes a front panel and the drawer slides through an opening in the front panel in another embodiment. The opening is located substantially at the top of the front panel in yet another embodiment.

A tray is disposed in the welding-type power supply to inhibit the drawer contents from falling into the welding-type power supply in one embodiment. The tray is attached to the drawer in another embodiment and a pair of slides connect the drawer to the tray in one other embodiment. The welding-type power supply includes a lift eye and the drawer is supported in the welding-type power supply by the lift eye in one embodiment. The drawer is sized to accommodate a torch usable with the welding-type power supply in one other embodiment.

A third and fourth of these aspects include a storage compartment disposed inside of the welding-type power supply. The storage compartment is movable in the third of these aspects. The storage compartment has a height, width and depth that are sufficient to accommodate a torch usable with the welding-type power supply according to the fourth of these aspects.

The storage compartment is disposed substantially at the top of the welding-type power supply in one embodiment and is disposed above a control panel of the welding-type power supply in another embodiment. The welding-type power supply includes a chassis having a top panel and the storage compartment is disposed below the top panel in an alternative embodiment. The welding-type power supply includes a front panel and the storage compartment slides through an opening in the front panel in one other alternative embodiment. The opening is located near the top of the front panel in another embodiment.

A tray is disposed in the welding-type power supply to prevent the contents of the storage compartment from falling into the welding-type power supply in one embodiment. The tray is attached to the storage compartment in another embodiment. The storage compartment is sized to accommodate a torch usable with the welding-type power supply in yet another embodiment.

According to a fifth aspect of the invention, an apparatus includes a drawer. The drawer is configured to mount inside of a welding-type power supply such that the drawer is movable in and out of the welding-type power supply. The apparatus includes a tray configured to mount inside of the welding-type power supply such that the contents of the drawer are prevented from falling into the welding-type power supply by the tray in another embodiment. The dimensions of the drawer are sufficient to allow a torch usable with the welding-type power supply to be stored in the drawer in another embodiment.

According to a sixth aspect of the invention, an apparatus includes a tray, a pair of slides and a drawer. The tray is configured to mount inside of a welding-type power supply. The pair of slides are attached to the tray. The drawer is attached to the pair of slides such that the drawer can slide in and out of the welding-type power supply.

According to a seventh aspect of the invention, an apparatus includes a storage compartment sized to store a torch usable by a welding-type power supply. The storage compartment is located inside of the welding-type power supply.

According to an eighth aspect of the invention, a method of retrieving a welding-type accessory during a welding operation includes opening a drawer to gain access to the welding-type accessory, removing the welding-type accessory from the drawer and closing the drawer after the welding-type accessory is removed from the drawer. The drawer is disposed inside of a welding-type power supply;

According to a ninth aspect of the invention, a method of storing a welding-type accessory inside of a welding-type power supply includes opening a storage compartment, placing the welding-type accessory inside of the open storage compartment and closing the storage compartment. The storage compartment is opened by sliding the storage compartment out from the inside of the welding-type power supply and is closed by pushing the storage compartment back into the inside of the welding-type power supply.

Other principal features and advantages of the invention will become apparent to those skilled in the art upon review of the following drawings, the detailed description and the appended claims.

Figure 1:
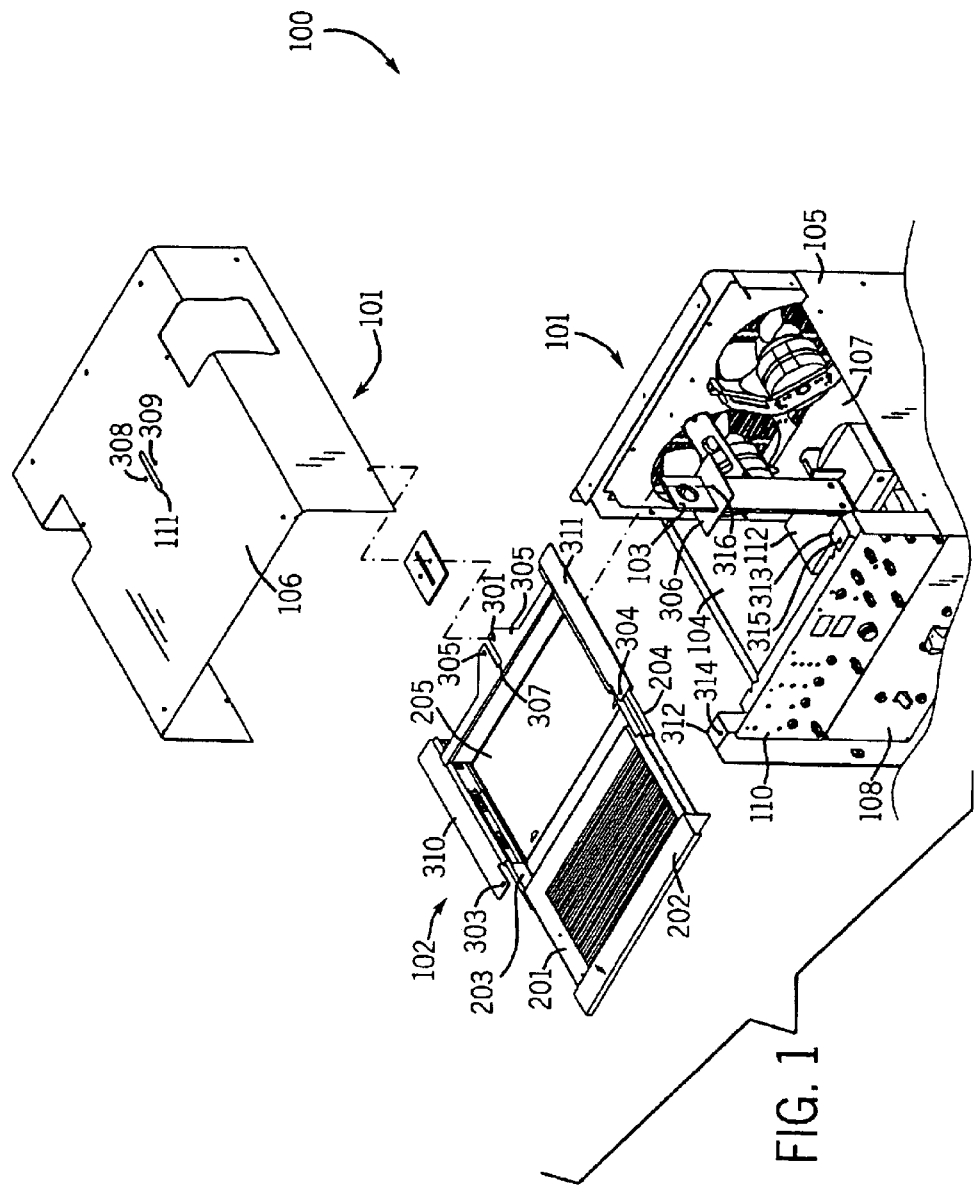
FIG. 1 shows an exploded view of a welding-type power supply having a drawer according to one embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular storage compartment or drawer having a particular configuration and particular features, the present invention is not limited to this configuration or to these features and other configurations and features can be used. Likewise, although the present invention will be illustrated with reference to a particular welding-type power supply having a particular configuration and particular features, the present invention is not limited to this configuration or to these features and welding-type power supplies having other configurations and features can be used.

Generally, the present invention involves a storage compartment for storing welding-type accessories used before, during or after welding, plasma cutting or induction heating operations. The storage compartment is movable in one embodiment. The storage compartment is a drawer in another embodiment. In other embodiments, other types of movable storage compartments are integrated into, or located inside of, the welding-type power supply including cabinets, boxes and compartments. Drawer, as used herein, includes any sliding compartment, box or receptacle that is opened by pulling out and that is closed by pushing in. The drawer is integrated into the welding-type power supply in this embodiment. Integrated, as used herein, means the storage compartment or drawer is incorporated into and is made part of the welding-type power supply. The integration typically occurs when the welding-type power supply is manufactured. Integrated drawers or storage compartments may or may not be removable from the welding-type power supply.

The drawer is located at or near the top of the welding-type power supply and is accessible from the front of the machine in one embodiment. Near the top, as used herein, means that the storage compartment is closer to the top of the welding-type power supply than it is to the bottom of the welding type power supply. The front, or front panel, as used herein, is the side of the welding-type power supply or panel that includes the control panel. Control panel, as used herein, means the panel that includes a majority of the external control knobs, dials and buttons for adjusting the welding-type power supply.

FIG. 1 according to one embodiment of the present invention shows a welding-type power supply 100 including a chassis 101, a drawer assembly 102 and a lift eye 103. Chassis 101 includes a pair of side panels 104, 105, a top panel 106, a rear panel 107, a front panel 108 and a base (not shown). Front panel 108 includes a control panel 110. Lift eye 103 projects upward through the top of welding-type power supply 100 through a slot 111 in top panel 106.

Drawer assembly 102 in this embodiment includes a drawer that is movable. The drawer slides in and out of chassis 101 through an opening in chassis 101 above front panel 108. In another embodiment, front panel 108 includes an opening for the drawer. In other embodiments, the drawer slides in and out of chassis 101 at a different location such as in and out of the side of chassis 101 or the rear of chassis 101. In yet another embodiment, the movable storage compartment is hinged and moves in and out of the welding-type power supply by pivoting about the hinge.

The opening above front panel 108 for the drawer is located near the top of welding-type power supply 100 just underneath top panel 106. In other words, drawer 102 is incorporated into welding-type power supply 100 and is disposed substantially at the top of welding-type power supply 100. In other embodiments, the drawer is located at other locations such as near the bottom of the welding-type power supply 100 or at or substantially at the bottom of welding type power supply 100. Near the bottom, as used herein, means that the storage compartment is closer to the bottom of the welding-type power supply than it is to the top of the welding type power supply.

Welding-type power supply 100 also includes numerous internal components including a transformer assembly 112, a rectifier assembly (not shown) and a circuit board assembly (not shown). Drawer assembly 102 in the embodiment of FIG. 1 is disposed inside of welding-type power supply above these internal electrical components. In other embodiments, drawer assembly 102 is located below the internal electrical components of welding-type power supply 100. In yet another embodiment, drawer assembly 102 is disposed inside of welding-type power supply with some of the internal electrical components above drawer assembly 102 and with some of the internal electrical components located below drawer assembly 102.

Figure 2:
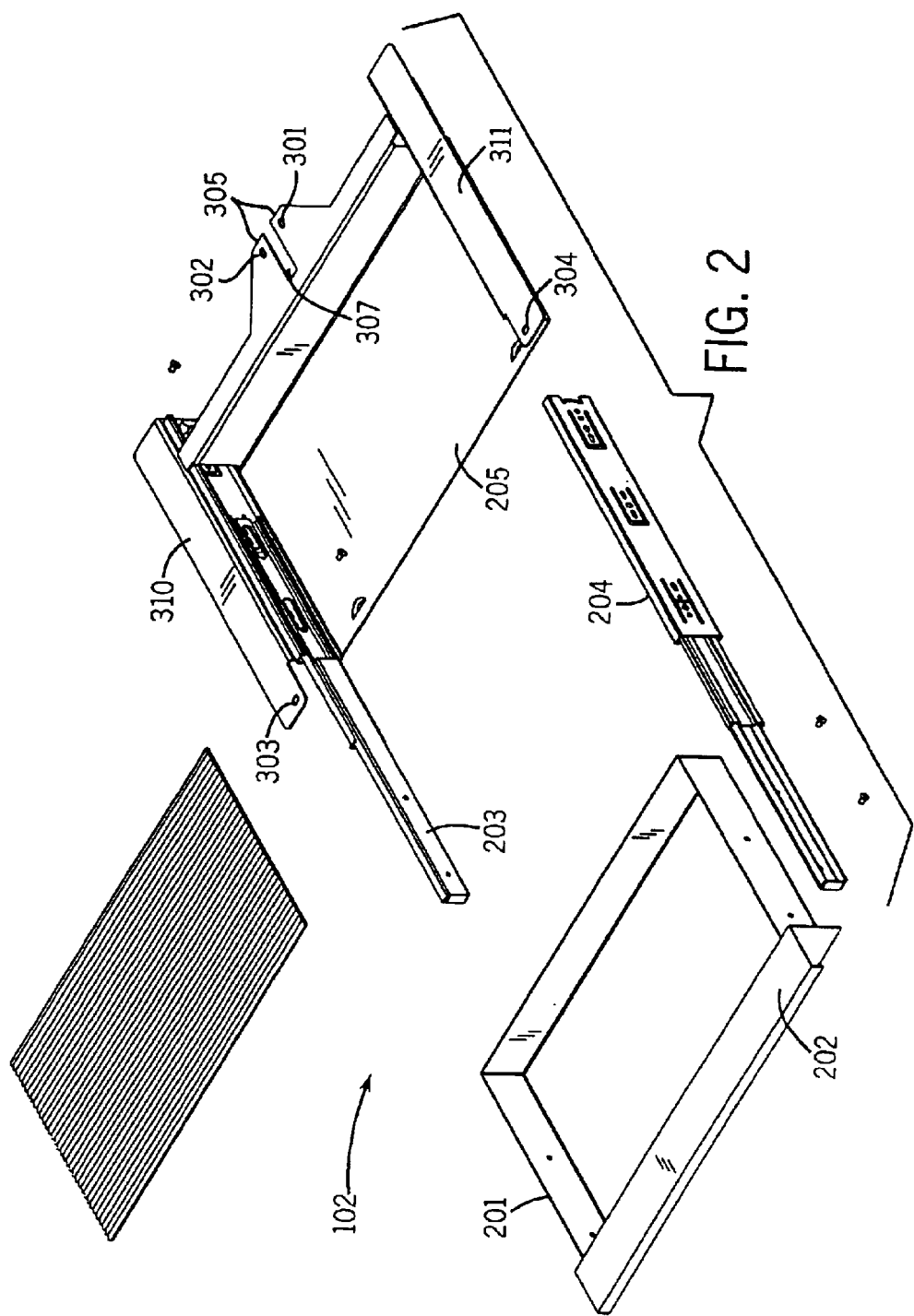
FIG. 2 shows an isometric view of a drawer for a welding-type power supply according to one embodiment of the present invention.

Drawer assembly 102 in this embodiment as shown in FIG. 2 includes a drawer 201, a front member 202, a pair of slides 203, 204 and a tray (also called a shield) 205. Drawer 201 and front member 202 in this embodiment are formed from 18 gauge steel sheet metal. Tray 205 is formed from 16 gauge steel sheet metal. Each of these pieces is formed into its desired shape prior to assembly. In alternative embodiments, other gauges of metal or other materials are used to make the drawer, front member, and tray including molded plastics.

Tray or tray member (or shield or shield member), as used herein, includes any structure that is disposed inside of the welding type power supply to prevent or inhibit the contents of the drawer or other storage compartment from falling into the welding-type power supply or to prevent or inhibit exposure of internal electrical components to human contact. Although tray 205 is part of drawer assembly 102 and is attached to drawer 201 in this embodiment, in other embodiments tray 205 is separate from drawer assembly 102. Attached, as used herein with respect to drawers and trays, means attached either directly or through another structure such as a slide or pair of slides but does not include attachment through the chassis of the welding-type power supply.

Once formed, front member 202 is welded to drawer 201. Slides 203, 204 are then mechanically fastened to both the sides of drawer 201 and to the sides of tray 205 to complete the assembly of drawer assembly 102. Slides 203, 204 in this embodiment are conventional telescoping drawer slides. One such slide is the Accuride slide, model 3832A manufactured and sold by Accuride International Inc. of Santa Fe Springs, Calif. In other embodiments, other types of slides are used.

Drawer 201 can vary in size from welding-type power supply to welding-type power supply. Drawer 201 in the embodiment shown in FIG. 2 is approximately 16 inches wide, 9 inches long and 2 inches deep. As a result, drawer 201 is of sufficient size in this embodiment to accommodate a spare torch that is usable by power supply 100. In other embodiments, the dimensions (e.g., length, width, depth, height, diameter, circumference) of the storage compartment or drawer are chosen to accommodate some of the other welding-type accessories usable with the welding-type power supply including spare parts, torches, consumable materials, remote control units, instruction manuals, work orders, work instructions, gloves and various tools.

Drawer assembly 102 is mounted to welding power supply 100 using four mounting holes 301, 302, 303 and 304 (see FIG. 2). Mounting holes 301 and 302 are located on a rear projecting horizontal flange 305 of tray 205. Flange 305 is disposed to rest on a horizontal flange 306 that is integral with lift eye 103. Horizontal flange 306 is located just below top panel 106. A slot 307 in flange 305 is provided to receive lift eye 103. Slot 307 allows flange 305 to be positioned on either side of lift eye 103. Sheet metal screws (not shown) are then inserted through holes 308, 309 in top panel 106, through mounting holes 301, 302 in flange 305, and into corresponding holes 316 (only one of which is shown in FIG. 1) in horizontal flange 306 to secure the rear of tray 205 (and also drawer assembly 102 and drawer 201) in place inside of welding-type power supply 100.

Tray 205 also includes a pair of horizontal side flanges 310, 311, one of which is located on either side of tray 205. Mounting holes 303, 304 are located near the front of tray 205 in side flanges 310, 311. Each side flange 310, 311 rests on a corresponding horizontal flange 312, 313. Flanges 312, 313 are part of front panel 108 in this embodiment. Sheet metal screws (not shown) are inserted through holes in top panel 106, through holes 303, 304 in side flanges 310, 311 and through corresponding holes 314, 315 in flanges 312, 313 to secure the front of tray 205 and drawer assembly 102 in place inside of welding-type power supply 100.

Tray or shield 205 is disposed around and directly below drawer 201 in this embodiment when drawer assembly 102 is mounted into power supply 100. Tray 205 is provided to prevent or inhibit the contents of drawer 201 from falling into the inside of welding-type power supply 100 or to prevent or inhibit exposing internal electrical components to human contact. In other embodiments of the present invention, no tray or shield is provided. In yet other embodiments, a tray or other shielding structure separate from drawer assembly 102 is provided to prevent or inhibit the drawer contents from falling into the inside of the welding-type power supply. For example, chassis 101 may include an inside panel disposed below or around the drawer to inhibit or prevent the contents of the drawer from falling into the remaining portion of the power supply.

Drawer 201 is conveniently disposed in power supply 100 to allow an operator to retrieve welding-type accessories with ease before, during and after welding-type operations. All that is required is for the operator to slide open drawer 201, remove the desired welding-type accessory from the drawer and close the drawer after the item is removed. Similarly, a welding-type accessory is easily stored in drawer 201 by sliding drawer 201 open from the front of the welding-type power supply, placing the welding-type accessory in the drawer and then closing the drawer from the front of the welding-type power supply.

Numerous modifications may be made to the present invention which still fall within the intended scope hereof. Thus, it should be apparent that there has been provided in accordance with the present invention a storage compartment for storing welding-type accessories that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An apparatus comprising:
    a welding-type power supply having a housing defined by a frame connected to a base; and
    a drawer disposed inside of the welding-type power supply between a top of the frame and the base.

2. The apparatus of claim 1 wherein the drawer is disposed near the top of the welding-type power supply.

3. The apparatus of claim 1 wherein the welding-type power supply includes a control panel and the drawer is disposed above the control panel.

4. The apparatus of claim 1 wherein the welding-type power supply includes a chassis having a top panel and the drawer is disposed below the top panel.

5. The apparatus of claim 1 wherein the welding-type power supply includes a front panel and further wherein the drawer slides through an opening in the front panel.

6. The apparatus of claim 5 wherein the opening is located substantially at the top of the front panel.

7. The apparatus of claim 1 further including a tray disposed in the welding-type power supply to inhibit the drawer contents from falling.

8. The apparatus of claim 7 wherein the tray is attached to the drawer.

9. The apparatus of clam 7 further including a pair of slides connecting the drawer to the tray.

10. The apparatus of claim 1 wherein the welding-type power supply includes a lift eye and the drawer is supported in the welding-type power supply by the lift eye.

11. The apparatus of claim 1 wherein the drawer is sized to accommodate a torch usable with the welding-type power supply.

12. An apparatus comprising:

an enclosure having a base, a plurality of sides, and a cover;

welding-type electronics disposed within the enclosure; and a storage compartment removably disposed inside the enclosure.

13. The apparatus of claim 12 wherein the storage compartment is disposed substantially at the top of the enclosure.

14. The apparatus of claim 12 further comprising a control panel mounted to a front of the enclosure and wherein the storage compartment is disposed above the control panel.

15. The apparatus of claim 12 further comprising a chassis disposed within the enclosure having a top panel and the storage compartment is disposed below the top panel.

16. The apparatus of claim 12 further comprising a front panel and wherein the storage compartment slides through an opening in the front panel.

17. The apparatus of claim 16 wherein the opening is located near the top of the front panel.

18. The apparatus of claim 12 further including a tray disposed in the enclosure to prevent the contents of the storage compartment from falling in the enclosure.

19. The apparatus of claim 18 wherein the tray is attached to the storage compartment.

20. The apparatus of claim 12 wherein the storage compartment is sized to accommodate a torch usable with the welding-type power supply.

21. An apparatus comprising:

a housing having a base panel, a plurality of side panels extending from the base panel, and a cover disposed about the plurality of side panels;

welding-type power supply electronics disposed within the housing; and means for storing welding-type accessory inside of the housing adjacent to the welding-type power supply electronics wherein the means for storing is removably stored inside the housing.

22. The apparatus of claim 21 further including means for preventing the contents of the storage compartment from falling into the welding-type power supply.

23. The apparatus of claim 21 wherein the means for storing is configured to store a torch usable with the welding-type power supply.

24. An apparatus comprising:

a welding-type power supply defined by a substantially closed volume; and a storage compartment having a height, a width and a depth, wherein the height, width, and depth of the storage compartment are sufficient to accommodate a torch unable with the welding-type power supply, and further wherein the storage compartment as slidingly disposed inside of the substantially closed volume.

25. An apparatus comprising:

a welding-type power supply;

a lift eye;

a drawer disposed inside of the welding-type power supply and supported by the lift eye.

26. A welding-type power supply comprising:

a chassis supporting a plurality of welding-type electronics;

a cover panel attached to an end of the chassis; and a storage compartment retractably positioned in a volume defined between the cover panel and the chassis.

27. The welding-type power supply of claim 26 wherein the storage compartment includes a retractable tray.

28. The welding-type power supply of claim 26 wherein the chassis further supports a lift eye and wherein the storage compartment is configured to engage the lift eye when in a retracted position.

29. The welding-type power supply of claim 26 wherein the chassis supports a front control panel and wherein the storage compartment is configured to retract along a plane extending between the front control panel and the cover panel.

30. The welding-type power supply of claim 26 wherein the storage compartment is configured to hold a welding torch.

* * * * *